United States Patent [19]

Moses et al.

[11] Patent Number: 4,813,072

[45] Date of Patent: Mar. 14, 1989

[54] SWITCHING DEVICE FOR POWER SUPPLY TO ADDITIONAL ACCESSORIES FOR A TELEPHONE

[75] Inventors: Klaus Moses, Frankfurt am Main; Heinz Lange, Frankfurt, both of Fed. Rep. of Germany

[73] Assignee: Telenorma Telefonbau und Normalzeit GmbH, Fed. Rep. of Germany

[21] Appl. No.: 55,013

[22] Filed: May 28, 1987

[51] Int. Cl.[4] .............................................. H04M 1/00
[52] U.S. Cl. ..................................... 379/388; 379/387
[58] Field of Search ............... 379/387, 388, 389, 390, 379/413, 420

[56] References Cited

U.S. PATENT DOCUMENTS 4,488,006  12/1984  Essig et al. ........................ 379/387
4,608,462  8/1986  Blomley et al. ..................... 379/390
4,653,088  3/1987  Budd et al. ...................... 379/413 X

FOREIGN PATENT DOCUMENTS 3404335  11/1984  Fed. Rep. of Germany .
3429330  2/1986  Fed. Rep. of Germany .

Primary Examiner—James L. Dwyer
Attorney, Agent, or Firm—Steele, Gould & Fried

[57] ABSTRACT

In a switching device for power supply to accessories included in a telephone device, from the loop current to the telephone device, a parallel load is connected between the intercom cables for carrying the loop current, a supply current for the accessories being distributed by a current distribution switching section at the output of the parallel load, according to priority classes assigned to the respective accessories. The control device of the telephone has a highest priority, possibly in combination with a speech mode. This control device has a memory for storing the last-dialed telephone number for the purpose of repeated re-dialing. The memory contents are retained for several hours after the device is switched off the cables. The memory is powered independently of the control in an embodiment with a separate supply connection, or, where the memory is part of the control device, this device will receive its voltage supply through a capacitor, whereby the charging of the capacitor is given the next lower priority. A loudspeaker and/or hands off device can be connected to the next sequential output of the current distribution switching section, so that the capacitor reaches full charge voltage after the handset is lifted off, before the loudspeaker device is supplied with current from the loop current.

4 Claims, 2 Drawing Sheets

SWITCHING DEVICE FOR POWER SUPPLY TO ADDITIONAL ACCESSORIES FOR A TELEPHONE

BACKGROUND OF THE INVENTION

1. Field of the Invention

The invention concerns a switching device for supplying power to additional accessories for a telephone device. Power is supplied from the loop current provided to the extension circuit of the telephone device, which defines a load switched in parallel across a pair of signal lines on the extension circuit connected to the telephone device when the device is activated. The distribution of the feed current occurs by means of a current distribution switching means operating in conjunction with the parallel load, at outputs corresponding to the respective additional accessories and assigned priorities for power supply. The supply voltage for the accessories is increased corresponding to increased loop current, and the control device of the telephone unit receives the highest priority, possibly in combination with operation of speech transmitting or receiving means. The loudspeaker and/or hands off device receives a lower priority.

2. Prior Art

A switching device of this general nature is aleady known. A switching device for supplying power to additional accessories for a telephone is described in German Offenlegungsschrift No. 34 04 335, in which the parallel load is defined by a reactance step with constant resistance characteristics. Excess current flows via the parallel load to branched-off loop current including a loop directed to a current stabilizer for a microphone. The parallel load has a current distribution switching means with several power supply outputs, of which one output has the highest priority and the other outputs have declining priorities. The power supply inputs to the additional accessories are connected with these outputs according to their relative importance.

Accordingly, the highest priority can be assigned to the control device, possibly together with speech transmission means, if the latter is not already powered via a current stabilizer. As a rule, the control device requires a relatively low but constant current. The rest of the loop current is made available for the operation of the loudspeaker and/or hands off device.

The control device may have a function requiring supply of power for an extended time, for example including a selection device for transmitting successive digits of a telephone number from a dialing keyboard, in the form of digital switching impulses and/or plural tone signals, and may include a memory for repeated dialing in which the last-dialed telephone number is stored and can be recalled by pressure on a key and again transmitted to the extension connection. In such a system, care must be taken that the telephone number, i.e. the content of the memory, remains stored in the memory at least for a certain time after the handset has been replaced and the supply of current from the switched loop is lost.

An object of the present invention is to provide a switching device for a telephone device of the type having a switched-in parallel load and a current distribution switching means, in which such repeated dialing is still possible for a predetermined time period after replacing the handset.

This object is achieved according to the invention in that the control device has a memory with its own power supply connection, separate from that of the control device in general. This power supply connection is connected to a power supply output of the next lower priority with a capacitor for retaining power to the memory, while the power supply to the loudspeaker and/or hands off device is obtained from the power output with a lower priority.

In this manner, as soon as the handset is lifted the total available excess of loop current can immediately be drawn via the second output of the current distribution switching means to charge the capacitor. One consequence of this arrangement is that during charging of the capacitor, the loudspeaker and/or hands off device receives no current feed. However, this is not disturbing, since the loop currrent begins to flow as soon as the handset has been lifted and the telephone device is switched in. The loudspeaker and/or hands off device can be used after a short charging period of the capacitor.

Should the control device have no separate current supply connection for the memory, a further development of the invention consists in that the supply connection of the control device can be connected with the supply output of the next lower priority and with a memory capacitor via a first Schottky (zener) diode, while the supply to the loudspeaker and/or hands off device is provided by the feed output of lower priority.

Since in this case, the power supply connection to the control device is connected both to the supply output with the highest priority and to the supply output for the next lower priority in the current distribution switching system, the Schottky diode (i.e., zener diode) prevents charging of the memory capacitor from the output with the highest priority.

Further advantages will also be apparent.

BRIEF DESCRIPTION OF THE DRAWINGS

The invention is explained in greater detail with reference to two preferred embodiments, represented in the drawings, wherein.

DETAILED DESCRIPTION OF THE PREFERRED EMBODIMENTS

Figure 1:
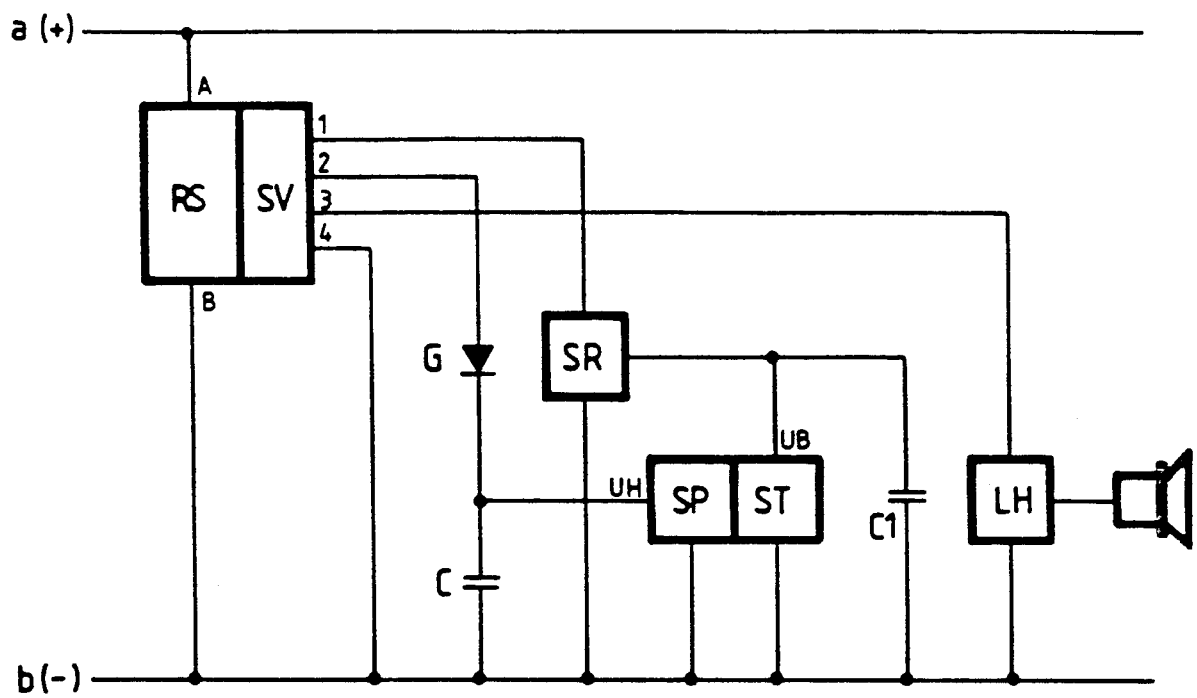
FIG. 1 is a schematic diagram showing the application of the invention to a control device, of which the memory has a separate power supply connection.
Figure 2:
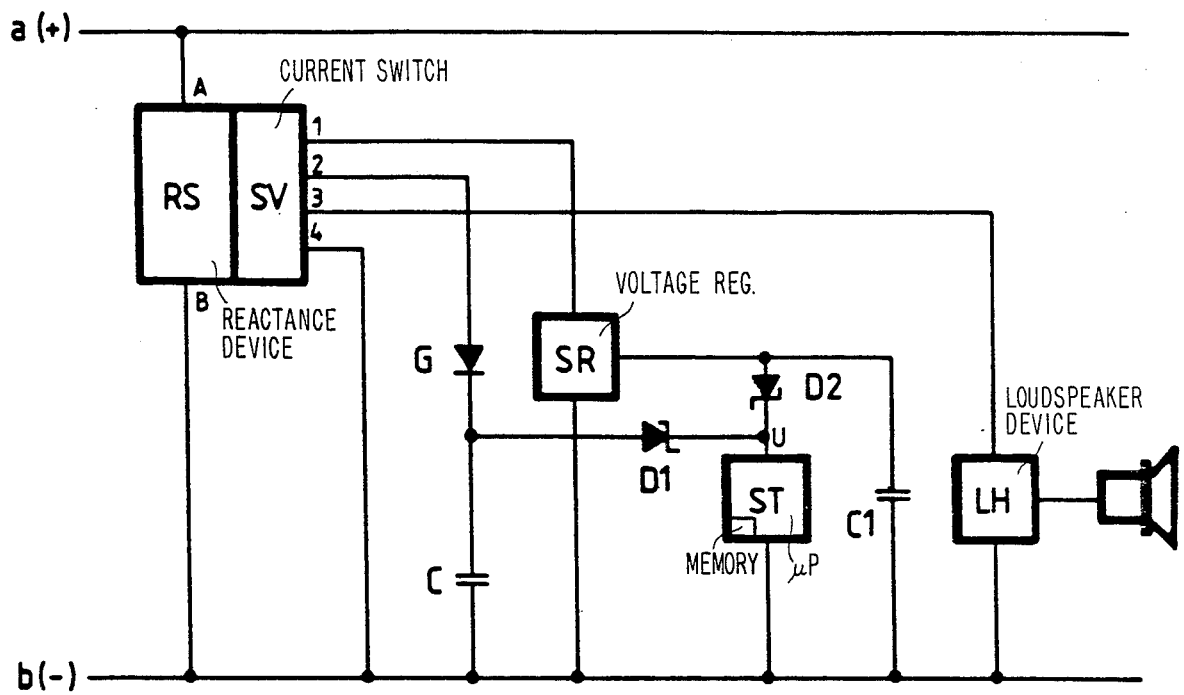
FIG. 2 illustrates the application of the invention for a control device, of which the memory has no separate power supply connection.

By means of a schematic block diagram, FIGS. 1 and 2 show only those devices in a telephone device which are absolutely necessary for understanding the invention.

With respect to additional details, which are not further discussed within the framework of the present description, reference is made to German Offenlegringsschrift No. 34 04 335.

A parallel load in the form of a reactance step RS is switched across intercom cable pair a/b. As will be described in greater detail herein, this reactance step delivers feed current to several users, whereby the total of these currents corresponds to the loop current which flows via the reactance step. By operation of the current distribution switching means SV, this current is distributed among outputs 1, 2, 3 and 4 thereof. The current distribution switching means SV is structured so that a feed current can be drawn at output 1 which current, at its maximum, corresponds to that current which flows into the reactance step RS. In such a case, no current is available to be drawn at the other outputs 2, 3, and 4. If a lower proportion of the total available current is drawn at output 1, the remaining current can be drawn from output 2, whereby, again, the outputs 3 and 4 are left without current. If, on the other hand, no current is drawn from the outputs 1 and 2, the total current flowing into the reactance step RS at input A will be available at output 3. Since the users connected to the outputs 1 through 3 are connected on their return lines to the b cable and the output 4 is directly connected to the b cable, a current is always flowing via the reactance step RS, the value of which current corresponds either to the total loop current (if the supply to the listening and speaking devices, which are not shown, also goes via output 1) or to the loop current minus the supply current delivered to the current stabilizer for the microphone, which is not shown.

The control device ST can be embodied to include a microprocessor and operates for example to detect the conditions of the service elements in the telephone, to generate indicator information, and to transmit dialing information. The control device is needed not only during the dialing process for advantageously can also be operative for the duration of the use of the telephone. The control device may have a sensor device for sensing the switching conditions of keys (for example including the dialing keyboard, a limit key, a loudspeaker switch, etc.). The control device ST needs a constant operating voltage, which is maintained constant by the voltage regulator SR from the unregulated voltage supplied from the reactance step RS. The capacitor C1, which is switched in parallel with the supply voltage connection UB or U, serves as a supporting storage capacitor. In this manner, control device ST is supplied with energy with capacitor C1 during the loop interruption occurring in conjunction with selection of pulse dialing.

The control device ST has a memory, which, for the purpose of repeat dialings, serves to store the telephone number last dialed. The telephone number stored here can be recalled by pressure on a key to initiate the automatic re-dialing process.

In the embodiment of the invention shown in FIG. 1, a memory SP is supplied with energy via its own supply connection UH. This occurs via a capacitor C, which is charged via a blocking diode G from the current distribution switching means SV, namely from output 2 thereof. While the capacitor C1 is large enough so that after the handset has been replaced, i.e. after disconnection of the loop current running through the parallel load, the control device ST is briefly operational as required for example for indication of fee units or costs of the previous call, the capacitor C also stores sufficient charge such that the contents of the memory SP are retained for several hours, and a repeat dialing of a stored number is possible within this time period. The loudspeaker device LH is supplied via output 3 of the current distribution switching means SV, and the remainder of the loop current, which is not branched off through outputs 1 through 3, flows via the output 4 of the current distribution switching means SV into the return side, namely the b cable.

In the representative embodiment of the invention shown in FIG. 2, the memory is part of the control device ST and is supplied with energy through supply connection U to control device ST. In this case as well, there is a capacitor C, which is charged via output 2 of the current distribution switching means SV and an interspersed blocking diode G. Since the control device is also connected to the capacitor C as a user, it may be advisable to provide the capacitor with a higher capacity than in the embodiment of the invention according to FIG. 1. The capacitor C is connected to the supply connection U of the control device ST via a Schottky (zener) diode D1. This diode prevents charging of the capacitor C via the voltage regulator SR. An additional Schottky (zener) diode D2 is looped into the connection between supply connection U of the control device ST and the voltage regulator SR or the capacitor C1; this diode prevents a discharge of the capacitor C into the voltage regulator SR or the capacitor C1.

The supply connection UH of the memory SP may be an alternative supply connection. If the memory SP forms part of the control device ST, the current supply to memory SP is possible both via the supply connection UB of the control device and via the supply connection UH. Corresponding measures ensure that the control device ST is not fed via the supply connection UH.

It is further pointed out that the invention can also be applied to the object of the German Patent Application No. P 34 29 330.2.

What is claimed is:

1. A switching device for switching a power supply to additional accessories for a telephone set, said telephone set defining a load switchable in parallel across at least one pair of cable conductors of a telephone network, and when so switched, the cable pair and the load carrying a loop current, comprising:

a current distribution switching device connected to the parallel load and operative to distribute feed currents from the loop current to outputs connected to power the additional accessories, the outputs being assigned priorities and power being switched by said switching device and supplied to said outputs in accordance with an assigned set of priorities, supply voltage for the accessories being increased corresponding to an increased loop current, said accessories including at least a control device for the telephone set which is assigned a highest priority, and said accessories including at least one of a loudspeaker and hands-off device assigned a low priority, and wherein the control device has a memory with its own power supply connection, separate from a power supply to the control device, said power supply connection to the memory being connected to an output assigned a next lower priority below said highest priority and a memory capacitor connected thereto to retain a charge for powering the memory, and a power supply for said at least one of the loudspeaker and the hands-off device being assigned a sequentially lower priority than said next lower priority.

2. A switching device according to claim 1, wherein the control device of the telephone set is assigned the highest priority in combination with a speech unit for the telephone set.

3. A switching device for switching a power supply to additional accessories for a telephone set, said telephone set defining a load switchable in parallel across at least one pair of cable conductors of a telephone network, and when so switched, the cable pair and the load carrying a loop current, comprising:

A current distribution switching device connected to the parallel load and operative to distribute feed currents from the loop current to outputs connected to power the additional accessories, the outputs being assigned priorities and power being switched by said switching device and supplied to said outputs in accordance with an assigned set of priorities, supply voltage for the accessories being increased corresponding to an increased loop current, said accessories including at least a control device for the telephone set which is assigned a highest priority, and said accessories including at least one of a loudspeaker and hands-off device assigned a low priority, and wherein the control device has a memory and first and second power supply said second power supply connection being connected to an output assigned a next lower priority below said highest priority and a memory capacitor connected thereto to retain a charge for powering the memory, and a power supply for said at least one of the loudspeaker and the hands-off device being assigned a sequentially lower priority than said next lower priority wherein said second power supply supplies the charge of said memory capacitor to the control device through a first Schottky diode.

4. A switching device according to claim 3, wherein a second Schottky diode is interposed into the first power supply connection of said control device between the high priority output of the current distribution switching means and the power supply connection.

* * * * *